US010931701B2

(12) United States Patent
Hoorvitch et al.

(10) Patent No.: US 10,931,701 B2
(45) Date of Patent: Feb. 23, 2021

(54) AGENTLESS MANAGEMENT AND CONTROL OF NETWORK SESSIONS

(71) Applicant: CyberArk Software Ltd., Petach-Tikva (IL)

(72) Inventors: Ido Hoorvitch, Tel Aviv (IL); Yaacov Ben Naim, Shaalvim (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 16/923,545

(22) Filed: Jul. 8, 2020

(65) Prior Publication Data

US 2021/0021625 A1 Jan. 21, 2021

Related U.S. Application Data

(63) Continuation of application No. 16/515,409, filed on Jul. 18, 2019, now Pat. No. 10,749,885.

(51) Int. Cl.
*H04L 29/06* (2006.01)

(52) U.S. Cl.
CPC .......... *H04L 63/1425* (2013.01); *H04L 63/08* (2013.01); *H04L 63/102* (2013.01)

(58) Field of Classification Search
CPC .... H04L 63/1425; H04L 63/08; H04L 63/102
See application file for complete search history.

(56) References Cited

U.S. PATENT DOCUMENTS

| 8,467,770 | B1 | 6/2013 | Ayed et al. |
| 9,225,700 | B1 | 12/2015 | Dotan et al. |
| 9,271,110 | B1 | 2/2016 | Fultz et al. |
| 9,363,280 | B1* | 6/2016 | Rivlin ................. H04L 63/1433 |
| 9,497,206 | B2* | 11/2016 | Bernstein ............ H04L 63/1425 |
| 2004/0255167 | A1* | 12/2004 | Knight ................ H04L 63/1408 726/24 |
| 2005/0120101 | A1* | 6/2005 | Nocera ................. H04L 41/046 709/223 |
| 2011/0099620 | A1* | 4/2011 | Stavrou ............... H04L 63/0884 726/12 |

(Continued)

OTHER PUBLICATIONS

Communication and European Search Report dated Jan. 24, 2020, issued from the European Patent Office in corresponding Application No. 19188951.8-1218 (8 pages).

*Primary Examiner* — Khoi V Le
(74) *Attorney, Agent, or Firm* — Finnegan, Henderson, Farabow, Garrett & Dunner, LLP

(57) ABSTRACT

Disclosed embodiments relate to systems and methods for automatically and transparently detecting potential compromises or unauthorized use of endpoint computing devices. Techniques include engaging, at a security server, in an agentless management session with an application running on an endpoint computing device; controlling, at the security server and through the agentless management session, a user-facing session of the application; receiving, at the security server, an indication of anomalous activity or loss of a proximity between at least one of: the one or more personal computing devices associated with the user and the endpoint computing device, or the one or more personal computing devices associated with the user and the user; and implementing a control action in the agentless management session, based on the received indication.

20 Claims, 6 Drawing Sheets

(56) References Cited

U.S. PATENT DOCUMENTS

| | | | |
|---|---|---|---|
| 2014/0282872 A1* | 9/2014 | Hansen | G06F 21/125 726/3 |
| 2014/0283068 A1* | 9/2014 | Call | G06F 21/566 726/23 |
| 2015/0067139 A1* | 3/2015 | Malnati | G06F 11/0748 709/224 |
| 2015/0222604 A1* | 8/2015 | Ylonen | H04L 63/10 713/171 |
| 2016/0350539 A1* | 12/2016 | Oberheide | H04L 63/20 |
| 2017/0118239 A1* | 4/2017 | Most | H04L 63/1425 |
| 2017/0221066 A1* | 8/2017 | Ledford | G06Q 20/407 |
| 2018/0225230 A1* | 8/2018 | Litichever | G06F 21/82 |
| 2018/0225434 A1* | 8/2018 | Sivakumar | G06F 21/316 |
| 2019/0109713 A1* | 4/2019 | Clark | H04L 9/3239 |

* cited by examiner

AGENTLESS MANAGEMENT AND CONTROL OF NETWORK SESSIONS

CROSS-REFERENCE TO RELATED APPLICATIONS

This application is a continuation of U.S. patent application Ser. No. 16/515,409, filed on Jul. 18, 2019 (pending). The aforementioned application is incorporated herein by reference in its entirety.

BACKGROUND

Techniques for permitting secure access to computing resources have limits. For example, when users seek access to secured computers, or secure applications or data accessible via a computing resource, the users may be prompted for authentication, authorization, or some other type of verification before access is permitted. While these techniques are designed to verify access to secure computing resources at the beginning of a session, they are powerless to detect improper access or wrongful activity during a session, much less control such behavior.

Improper access to an otherwise authorized computing session may occur in numerous ways. For example, after a user logs in to their computer in their office, they may leave the office for a period of time before returning. If the computing session is open while the user leaves, it is vulnerable to a malicious individual improperly using the session while the user is gone. As another illustration, while a user is accessing a secure application or data in a public area, such as a coffee shop or airport, they may temporarily step away from their computer to use the restroom, pay a cashier, or talk with another person. In that situation, a malicious individual may potentially view or utilize the secure application or data. A further situation may involve a user's computer being stolen while logged into a secure session. The thief may potentially be able to use the secure session while the session is ongoing. Ultimately, in these scenarios and many others, sensitive or privileged access to computing resources may be limited initially, but not while a session is ongoing.

One attempt to address these problems may include installing a dedicated software agent on the user's computer. According to such a technique, the dedicated agent may detect when the user is no longer physically present, or may detect a period of inactivity, and may consequently lock the computer screen. One significant technical deficiency in this approach is that it requires the user to download and use the dedicated software agent. Because the dedicated agent is separate software from the software being used by the user which is to be secured, issues of compatibility and integration may exist. Further, this type of technique is significantly limited in its capabilities. This technique simply detects inactivity over time, but not other forms of insecure actions, behavior, or situations. For example, this technique generally cannot detect when a malicious user begins to access a computing device soon after the authorized user has left the computing device, Because no period of inactivity over a threshold amount of time would be detected, this technique would detect no threat or vulnerability. Thus, even if the user's computer is stolen and used by a malicious individual, this type of technique would detect no problem.

Another attempted approach may involve monitoring actual network traffic exchanged between an endpoint computing device and a remote computer or application. While this technique may allow for continuous evaluation of a user's session, it is high-overhead in terms of bandwidth, latency, processing, and storage. These problems are exacerbated when implementations scale up to involve many users or machines being monitored. Further, this approach gives rise to serious privacy concerns, both for end users and for the computers or applications they are communicating with. These privacy problems, together with the inefficiencies of this approach, make it unsuitable in most if not all implementations.

Accordingly, in view of these and other deficiencies in existing techniques for controlling access to secure network resources, technological solutions are needed for automatically and transparently detecting potential compromises or unauthorized use of endpoint computing devices or sensitive data. Solutions should advantageously be agentless and transparent from the perspective of an endpoint computing device and the user who uses the endpoint computing device. That is, no dedicated software agent should be required to be installed on the endpoint machine. While the user's session with the endpoint machine is ongoing, the techniques for detecting potential compromises or unauthorized use should in some embodiments be hidden or transparent to the user. The technical effectiveness of such solutions would also be improved by allowing various types of compromises or unauthorized use to be detected. Further, additional technical improvements would result from allowing multiple different types of control actions to be implemented (e.g., terminating a session, freezing a session, requiring re-authentication, generating an alert, recording a session, making a session read-only, etc.) when compromises or unauthorized use are detected. Additional technical advantages may arise from embodiments where the control or management session running on the endpoint device integrates code (e.g., Java™, HTML, Python, etc.), into the user's session (e.g., into the HTML-based, Java™-based, or other type of web-based document). In this manner, the code may instruct the user's session to perform one or more of the above control actions when the control or management session is lost. Thus, even if a malicious user unplugs the network connection (e.g., CAT-5, etc.) to the endpoint device or disables its wireless adapter card, a control action may still be implemented in that situation. Namely, the inserted code may instruct the endpoint computing device to perform the control action, even after a network connection is lost. These and other technological improvements over current secure access techniques are discussed below.

SUMMARY

Various disclosed embodiments describe non-transitory computer readable media, systems, and methods for automatically and transparently detecting potential compromises or unauthorized use of endpoint computing devices.

For example, in an exemplary embodiment, there may be a non-transitory computer readable medium including instructions that, when executed by at least one processor, cause the at least one processor to perform operations for automatically and transparently detecting potential compromises or unauthorized use of endpoint computing devices. The operations may include engaging, at a security server, in an agentess management session with an application running on an endpoint computing device, wherein the application is configured for use by a user; controlling, at the security server and through the agentless management session, a user-facing session of the application; receiving, at the security server, an indication of at least one of: anomalous activity of at least one of: the user, the endpoint computing device, or one or more personal computing device associated with the user, or loss of a proximity between at least one of: the one or more personal computing devices associated with the user and the endpoint computing device, or the one or more personal computing devices associated with the user and the user; and implementing a control action in the agentless management session, based on the received indication, wherein the control action in the agentless management session controls an attribute of the user-facing session.

According to a disclosed embodiment, the agentless management session is implemented through code received by the application from the security server.

According to a disclosed embodiment, the user-facing session is implemented through an iframe of the application.

According to a disclosed embodiment, the operations further comprise: detecting a loss of network communications between the application and the security server, and performing, based on the detection, at least one of: terminating the user-facing session, partially terminating the user-facing session, controlling the user-facing session to be read-only, or disabling privileged access from the endpoint computing device.

According to a disclosed embodiment, the agentless management session is implemented transparently to the user-facing session.

According to a disclosed embodiment, the engaging in the agentless management session occurs as part of an authentication or authorization process for the user of the endpoint computing device.

According to a disclosed embodiment, the control action includes authenticating or authorizing the user of the endpoint computing device.

According to a disclosed embodiment, the anomalous activity is determined using data from a camera associated with the endpoint computing device.

According to a disclosed embodiment, the anomalous activity is determined based on at least one of: typing activity, cursor activity, scrolling activity, browsing activity, or network access activity.

According to a disclosed embodiment, the anomalous activity is determined through reference to a behavioral profile associated with the user.

According to another disclosed embodiment, there may be a computer-implemented method for automatically and transparently detecting potential compromises or unauthorized use of endpoint computing devices. The method may comprise engaging, at a security server, in an agentless management session with an application running on an endpoint computing device, wherein the application is configured for use by a user; controlling, at the security server and through the agentless management session, a user-facing session of the application; receiving, at the security server, an indication of at least one of: anomalous activity of at least one of: the user, the endpoint computing device, or one or more personal computing device associated with the user, or loss of a proximity between at least one of: the one or more personal computing device associated with the user and the endpoint computing device, or the one or more personal computing devices associated with the user and the user; and implementing a control action in the agentless management session, based on the received indication, wherein the control action in the agentless management session controls an attribute of the user-facing session.

According to a disclosed embodiment, the control action includes generating a prompt for authentication in order to allow continued use of the user-facing session.

According to a disclosed embodiment, the control action includes terminating the user-facing session.

According to a disclosed embodiment, the control action includes generating an alert regarding the user-facing session.

According to a disclosed embodiment, the engaging in the agentless management session occurs as part of an authentication or authorization process for the user of the endpoint computing device.

According to a disclosed embodiment, the user-facing session was established based on a successful authentication of the user.

According to a disclosed embodiment, the successful authentication was based, at least in part, on the proximity between the one or more personal computing devices and the endpoint computing device.

According to a disclosed embodiment, the method is performed without requiring a dedicated agent on the endpoint computing device.

According to a disclosed embodiment, the method is performed without altering network traffic exchanged in the user-facing session.

According to a disclosed embodiment, the method is performed without receiving, at the security server, network traffic exchanged in the user-facing session.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
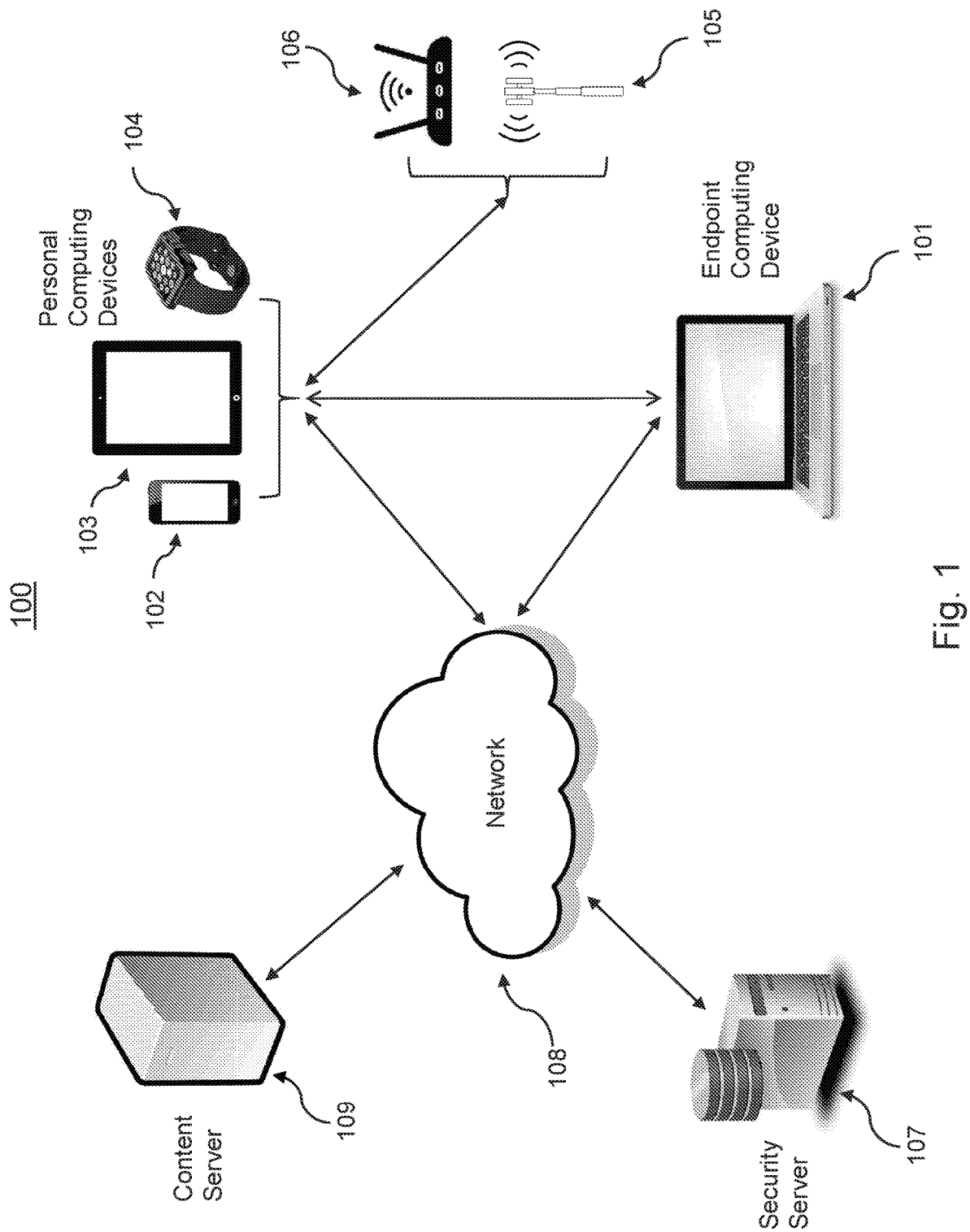
FIG. 1 is a block diagram of an exemplary system for automatically and transparently detecting potential compromises or unauthorized use of endpoint computing devices in accordance with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques of automatic and transparent detection of potential compromises or unauthorized use of endpoint computing devices described herein overcome several technological problems in the art. In contrast to conventional secure access techniques, which rely on dedicated software agents and detect, at most, only periods of inactivity, the disclosed techniques do not require a dedicated software agent and are able to detect various types of compromises and anomalous activity. Further, the disclosed techniques do not require all network traffic to be routed through or analyzed at a third-party security server, which may give rise to privacy concerns. Techniques that monitor and analyze all network traffic have serious deficiencies in terms of communication latency, bandwidth usage, storage requirements, and processing capabilities. These techniques also potentially expose user data or other sensitive data to third parties. By contrast, the disclosed techniques maintain user privacy and reduce these types of inefficiencies, while still allowing for robust detection of suspicious behavior and activity.

According to the techniques described below, a user may be authenticated and permitted to engage in a secure session with their computer or a secure resource (e.g., local application, remote application, sensitive data, etc.). In some embodiments, the authentication may involve the user receiving a code (e.g., QR code or other visual or audible code) via a personal computing device, decoding the code, and authenticating themselves using the personal computing device. Exemplary techniques of this authentication are described in CyberArk's™ U.S. patent application Ser. No. 16/059,556, titled "Secure Authentication"; Ser. No. 16/266,386, titled "SecureDistributed Transmission and Recombination of Secrets"; Ser. No. 16/298,149, titled "Secure Offline Caching and Provisioning of Secrets"; and Ser. No. 16/424,922, "Dynamic Log-Off Techniques for Securely Communicating Devices"; the disclosure of each of which is hereby incorporated by reference.

Once a user is engaged in a secure session with an endpoint computing resource, potential compromises or suspicious activity in the session may be detected. For example, a loss of proximity between the endpoint computing device and one or more personal computing devices of the user may be detected. Further, anomalous activity involving the endpoint computing device and/or one or more of the personal computing devices may be detected. In further embodiments, imaging equipment of the endpoint computing device may detect the absence of the authorized user and/or the presence of an unknown user. In these situations, an agentless management session running on the endpoint computing device (e.g., implemented via code in a web browser being used by the user, or another application being used by the user, etc.) may control the user's session. The control may include terminating the user's session, freezing the user's session, requiring re-authentication or verification before the user's session may continue, rendering the users session read-only, generating an alert, recording the user's session, or various other control actions. These and other techniques, representing substantial technological improvements over conventional secure access approaches, are described further below.

Reference will now be made in detail to the disclosed embodiments, examples of which are illustrated in the accompanying drawings.

FIG. 1 illustrates a block diagram of an exemplary system 100 for automatically and transparently detecting potential compromises or unauthorized use of endpoint computing devices 101. In accordance with FIG. 1, a user may be authenticated to endpoint computing device 101 or an application (e.g., remote or network-based) accessible through endpoint computing device 101. As noted above, the authentication may take several different forms, and may be based on parameters such as biometric or physical data of the user, a proximity between the user's personal computing device 102-104 and the endpoint computing device 101, or other techniques as discussed in CyberArk's™ U.S. patent application Ser. No. 16/059,556, titled "Secure Authentication"; Ser. No. 16/266,386, titled "Secure Distributed Transmission and Recombination of Secrets"; Ser. No. 16/298,149, titled "Secure Offline Caching and Provisioning of Secret"; and Ser. No. 16/424,922, "Dynamic Log-Off Techniques for Securely Communicating Devices"; the disclosure of each of which is hereby incorporated by reference.

In some cases, the authentication may be performed by security server 107. Either as part of the authentication or afterward, the endpoint computing device 101 may seek access to a resource hosted externally, such as at content server 109 (e.g., a web or internet page, an intranet page, an application running remotely, application content hosted externally, data hosted externally, etc.). Alternatively, endpoint computing device 101 may seek to access just locally available secure documents, data, or applications. Security server 107 may establish a control or management session in an agentless manner on endpoint computing device 101, such as through a frame, window, or other in-application interface (e.g., HTML iframe, Cascading Style Sheets (CSS), Hypertext Preprocessor (PHP), pop-up, etc.). The control or management session may run, according to these techniques, as code within the application being accessed by the user of endpoint computing device 101. As an illustration, if the user of endpoint computing device 101 is utilizing a web browsing application (e.g., Chrome™, Safari™, Internet Explorer™, etc.), the control or management session may be implemented via code integrated into the web content (e.g., HTML content, Java™ content, Flash™ content, etc.) being accessed by the endpoint computing device 101. Notably, the control or management session may run on the endpoint computing device 101 without any dedicated software agent on endpoint computing device 101.

While the control or management session is running, various types of suspicious or anomalous activity may be detected. For example, as discussed further below, security server 107 may detect, or receive a report indicating, a loss of proximity between the endpoint computing device 101 and one or more of the personal computing devices 102-104 of the user. For example, if the user was authenticated on endpoint computing device 101 in a manner that required proximity with a personal computing device 102-104, a loss of such proximity (e.g., the user with the personal computing device 102-104 walking away from endpoint computing device 101) may be detected in several different ways. Similarly, as another example, if a user (e.g., malicious or unauthorized user) of endpoint computing device 101 begins to use the endpoint computing device 101 or a personal computing device 102-104 in an anomalous manner (e.g., exhibiting a different typing pattern, unusual cursor pattern, atypical cursor activity, anomalous or sensitive browsing or file access activity, etc.), that anomalous activity may be detected by, or reported to, security server 107. Once security server 107 has detected or been alerted to potential unauthorized use of endpoint computing device 101 or a personal computing device 102-104, it may implement a control action. For example, as discussed below, the security server 107 may terminate the user's session (e.g., web browsing session, intranet session, application session, etc.), freeze the session, require re-authentication of the user in order to permit continued operation of the session, instruct endpoint computing device 101 to enter a safe or read-only mode, generate an alert, record the user session, etc. Further, as noted above, if a connection between security server 107 and endpoint computing device 101 is lost (e.g., the control or management session is terminated), the code inserted by security server 107 into the user's session may automatically instruct the user's session to perform one of these control actions. Thus, advantageously, even if the control or management session has been disabled (e.g., a malicious user unplugs an Ethernet cable of endpoint computing device 101 or disables its WiFi adapter), a control action may still be implemented on endpoint computing device 101 by virtue of the code integrated into the user's session from the control or management session.

In various embodiments, endpoint computing device 101 may be a computing device with hardware and software configured to access locally stored applications or data and/or remote applications or data (e.g., from content server 109). For example, endpoint computing device 101 may be a personal computer (e.g., desktop, laptop, etc.), a handheld device (e.g., a mobile phone, a tablet, or a notebook), a wearable device (e.g., a smart watch, smart jewelry, an implantable device, a fitness tracker, smart clothing, a head-mounted display, etc.), an IoT device (e.g., smart home device, industrial device, etc.), or various other types of devices capable of processing and/or receiving data. Consistent with the disclosure of CyberArk's™ U.S. patent application Ser. No. 16/059,556, titled "Secure Authentication"; Ser. No. 16/266,386, titled "Secure Distributed Transmission and Recombination of Secrets"; Ser. No. 16/298, 149, titled "Secure Offline Caching and Provisioning of Secrets"; and Ser. No. 16/424,922, "Dynamic Log-Off Techniques for Securely Communicating Devices"; endpoint computing device 101 may be capable of scanning or reading encoded media (e.g., QR codes, bar codes, etc.) as part of an authentication process with security server 107. Further, endpoint computing device 101 may include a network adapter (e.g., IEEE 802.11, cellular, etc.) enabling endpoint computing device 101 to communicate with external network resources (e.g., content server 109, security server 107, etc.). For example, endpoint computing device 101 may communicate wirelessly with a WiFi transceiver 106, with a cellular tower 105, or with various other types of wired or wireless communications systems.

Personal computing devices 102-104 may include various types of portable or mobile devices, such as a smartphone 102, tablet device 103, smart watch 104, or various other types of devices (e.g., computer-enabled clothing or jewelry, key fobs, access cards, etc.). In some embodiments, personal computing devices 102-104 may communicate through near-field wireless techniques with endpoint computing device 101 (e.g., Bluetooth™, Bluetooth Low Energy™, NFC, infrared, etc.). Further, personal computing devices 102-104 may in some embodiments communicate with endpoint computing device 101 and other devices through a WiFi router 106, cellular tower 105, or various other types of wired or wireless communications systems.

As illustrated in FIG. 1, endpoint computing device 101 may communicate indirectly with security server 107, content server 109, and other resources via network 108. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth™, NFC, infrared, etc.), or various other types of network communications. In some embodiments, the communications may take place across two or more of these forms of networks and protocols.

Security server 107 may be a server configured to perform one or more functions in the environment of FIG. 1. For example, security server 107 may be configured to authenticate users of endpoint computing device 101, such as through biometric techniques, or techniques involving encoded transmissions of keys or tokens (e.g., via QR codes, barcodes, etc.). As noted above, various techniques may be used for the authentication as described in CyberArk's™ U.S. patent application Ser. No. 16/059,556, titled "Secure Authentication"; Ser. No. 16/266,386, titled "Secure Distributed Transmission and Recombination of Secrets"; Ser. No. 16/298,149, titled "Secure Offline Caching and Provisioning of Secrets"; and Ser. No. 16/424,922, "Dynamic Log-Off Techniques for Securely Communicating Devices"; each of which is incorporated by reference. In some embodiments, security server 107 may also be configured to establish the control or management session, which controls the user's session on endpoint computing device 101, as discussed further below. In such embodiments, security server 107 may provide code that is inserted into an application, web page, intranet page, or other content being accessed by endpoint computing device 101, and used to control the user's session. This code may perform various control actions, as discussed below, when a potential compromise or anomalous use of endpoint computing device 101 is detected.

Security server 107 may be implemented in several ways. For example, security server 107 may be part of the same network as content server 109 and configured to protect applications or content hosted by content server 109. Further, security server 107 may be part of the same network as endpoint computing device 101. In further embodiments, security server 107 is a separate (e.g., third-party) server maintained by a security service provider.

Content server 109 may be configured to store or access (e.g., from a content delivery network (CDN) or other external source) various types of applications, documents, data, and other resources. For example, in some embodiments, content server 109 may be a web server (e.g., hosting and serving web documents, such as HTML-based, Java™-based, Flash™-based, or other types of web documents).

Further, content server 109 may be an application server providing a remotely executing application to endpoint computing resource 101. In further embodiments, content server 109 may be a secure database, file storage server, or other types of data hosting servers.

Figure 2:
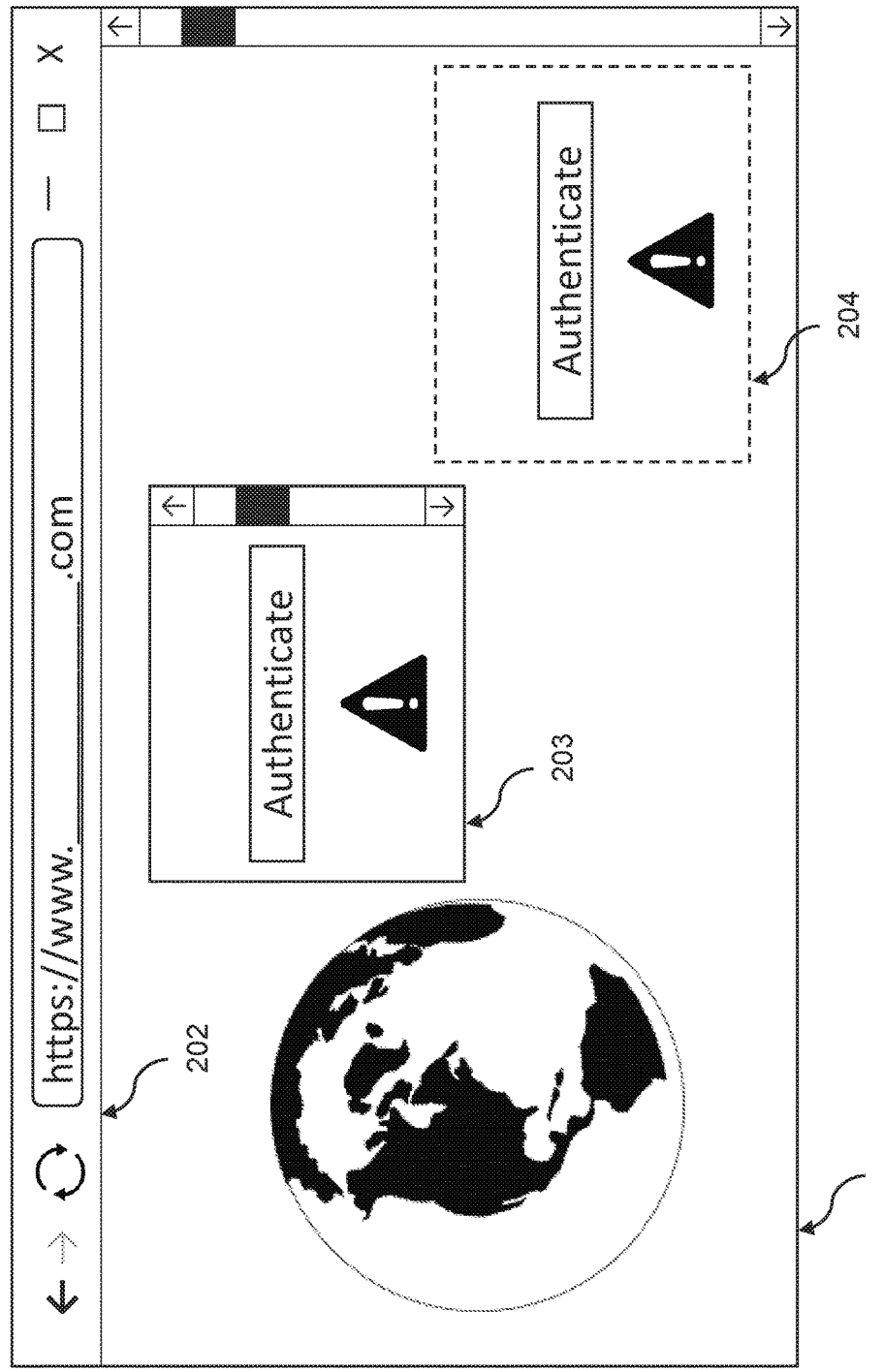
FIG. 2 is a block diagram of exemplary application interface including alternative versions of in-application frames in accordance with disclosed embodiments.

FIG. 2 illustrates a block diagram of exemplary application interface 200 including alternative versions of in-application frames 203-204. For example, in connection with FIG. 1, interface 200 may include a browser or application interface 201. In some embodiments, the browser or application interface 201 may be generated locally by endpoint computing resource 101 (e.g., based on alocally executing browser or application). In other embodiments, browser or application interface 201 may be generated based on a file, document, application, or data provided remotely from content server 109. For example, as illustrated in FIG. 2, browser or application interface 201 may display a web page associated with an address in address bar 202 (e.g., page based on HTML, Java™, Flash™, or other programming techniques). A user of endpoint computing device 101 may then engage with the browser or application interface 201. For example, the browser or application interface may be a log-on or authentication interface (e.g., in communication with security server 107), a news or social media interface, a business application interface, or various other types of interfaces, FIG. 2 also illustrates frames or windows 203-204, which may be implemented by code provided from security server 107. For example, frames or windows 203-204 may be iframes (e.g., HTML-based, CSS-based, PHP-based, etc.). As illustrated, the window or frame may be implemented in an interface 203 similar to interface 201 itself, including a scroll bar and visible window. In alternate embodiments, interface 204 may be implemented in a more lightweight or subtle manner, without a scroll bar or visible box. In such embodiments, interface 201 may be overlaid with graphics or selectable icons or elements of interface 204 without the appearance of a discrete window or frame. The size of interfaces 203-204 may also vary depending on the implementation. For example, in some embodiments interfaces 203-204 may occupy a limited portion of interface 201, as illustrated, while in other embodiments interfaces 203-204 may be co-extensive with interface 201 and occupy the entire interface 201. Various other techniques may be used to generate and display interfaces 203-204.

In connection with the discussion above, interfaces 203-204 may be implemented through control or management sessions controlled by security server 107. For example, in some embodiments security server 107 may be configured to inject control or management session code into web pages, intranet pages, or application content delivered from content server 109 to endpoint computing device 101. This may happen in a variety of ways. For example, security server 107 may be configured to intercept outbound communications from endpoint computing device 101 destined for content server 109, or incoming communications vice versa. In some embodiments, security server 107 may intercept only some outbound or inbound communications (e.g., having an IP address or MAC address, etc., matching content server 109 or endpoint computing device 101). Accordingly, if desired, only particular secure web pages, applications, documents, or data hosted by content server 109 may be protected by the control or management session, while other non-secure or non-sensitive web pages, applications, documents, or data may not be affected by security server 107.

Alternatively, rather than intercept communications between endpoint computing device 101 and content server 109, in some embodiments security server 107 may be configured to pre-install, or install in advance, control or management code into the browser or other application being used by the user of endpoint computing device 101. In this manner, the already-installed control or management code may establish a session between endpoint computing device 101 and security server 107 without necessarily filtering or intercepting communications between endpoint computing device 101 and content server 109. Accordingly, the control or management session need not intervene in or affect the traffic between endpoint computing device 101 and content server 109. Privacy in the user's session may thus be maintained. Notably, user privacy and data privacy are maintained while also achieving performance benefits over techniques that would require analyzing all communications exchanged between a user and an external computing resource.

The code inserted by security server 107 into the web page, intranet page, application content, or other content being provided from content server 109 may be based on a variety of programming languages and techniques, such as HTML, CSS, Java™, Python, PHP, SQL, or various others. Because the code implementing the control or management session between security server 107 and endpoint computing device 101 is inserted into the browser or other application being used by the user of endpoint computing device 101, the control or management session may be agentless from the perspective of endpoint computing device 101 and the user. That is, no separate and dedicated application is required on endpoint computing device to implement the control or management session. Further, in some embodiments the session between endpoint computing device 101 and content server 109 may be private or inaccessible to security server 107. For example, the user's session with content server 109 may be an encrypted point-to-point session, where security server 107 does not receive the contents of the user's session and/or cannot decrypt the contents of the session. Even in those situations, because the control or management session still controls the user's session from within the user's browser or other application, the user's session is still subject to control by the control or management session.

In some embodiments, the control or management session may instruct the endpoint computing device 101 to report certain data back to security server 107. For example, in the context of FIG. 1, endpoint computing device 101 may be instructed to report back to security server 107 an IP address or MAC address of endpoint computing device 101, an IP address or MAC address of personal computing devices 102-104, the status of a near-field communication session between endpoint computing device 101 and personal computing devices 102-104 (e.g., active, inactive, signal strength, etc.), browsing activity of endpoint computing device 101 or personal computing devices 102-104 (e.g., web pages or other resources accessed), file download activity of endpoint computing device 101 or personal computing devices 102-104, keystroke content or patterns of endpoint computing device 101 or personal computing devices 102-104, scrolling or viewing activity of endpoint computing device 101 or personal computing devices 102-104, facial recognition or facial presence data from endpoint computing device 101 or personal computing devices 102-104, gyroscope or accelerometer data (or other motion-indicative data) of endpoint computing device 101 or personal computing devices 102-104, or various other types of activity or behavior of endpoint computing device 101 or personal computing devices 102-104. As discussed further below, security server 107 may analyze this information to look for losses of proximity between endpoint computing device 101 and personal computing devices 102-104, or anomalous activity on endpoint computing device 101 or personal computing devices 102-104. In further embodiments, security server 107 may receive the above types of information directly from personal computing devices 102-104, from WiFi routers 106, from cellular towers 105, or from other types of communications systems.

Figure 3:
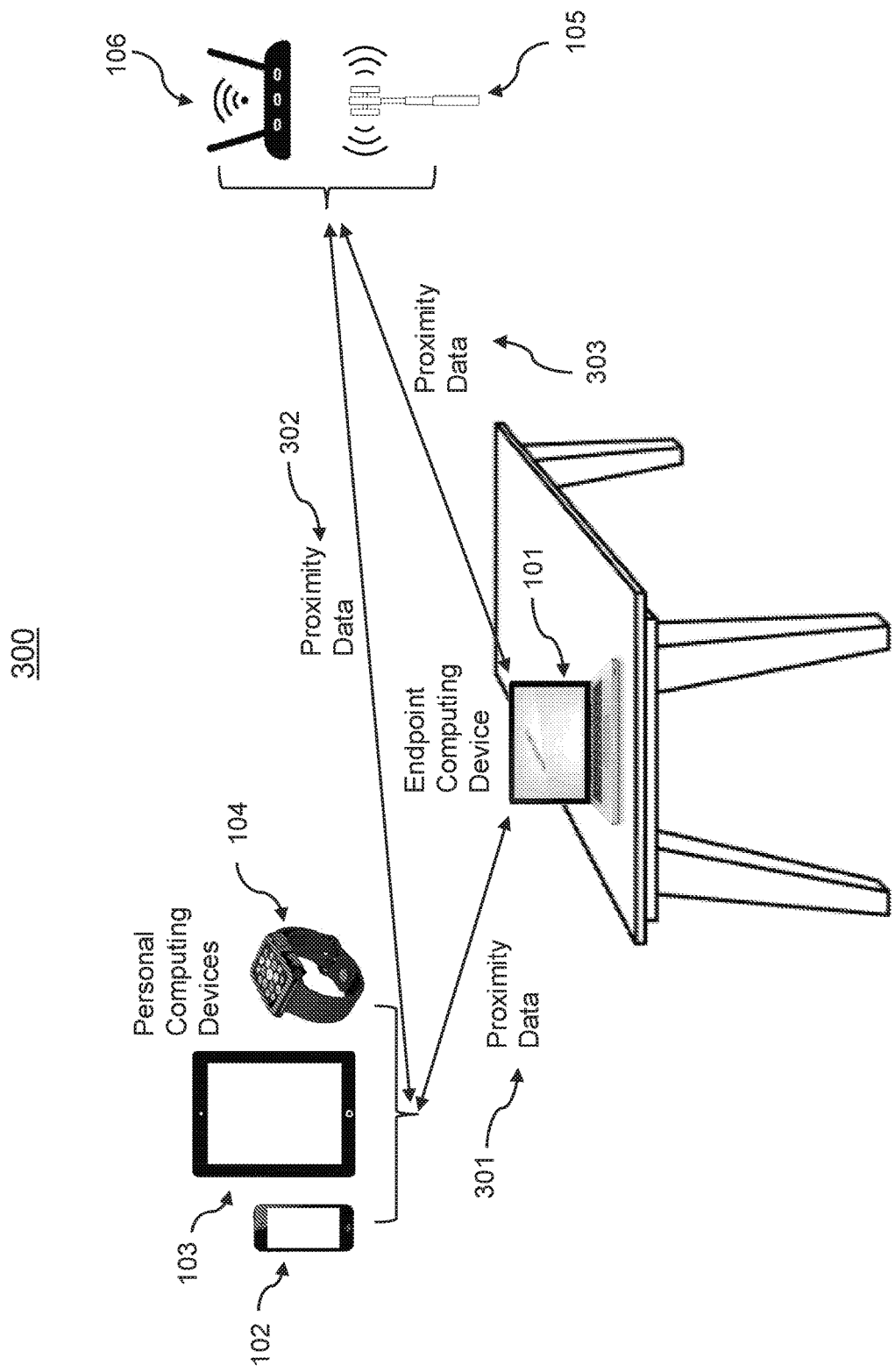
FIG. 3 is a block diagram of an exemplary system where a proximity between an endpoint computing device and one or more personal computing devices may be monitored in accordance with disclosed embodiments.

FIG. 3 illustrates a block diagram of an exemplary system 300 where a proximity between an endpoint computing device 101 and one or more personal computing devices 102-104 may be monitored. Consistent with the above discussion, system 300 may correspond to system 100 of FIG. 1, and may utilize the browser or application interfaces of FIG. 2.

As illustrated in system 300, various forms of proximity data may be observed or detected. For example, proximity data 301 between endpoint computing device 101 and personal computing devices 102-104 may be detected. Proximity data 301 may include raw data indicating the locations of endpoint computing device 101 and personal computing devices 102-104, or may include data actually indicating the proximity (or lack thereof) between endpoint computing device 101 and personal computing devices 102-104. For example, in some embodiments raw location data may include an IP address or MAC address of endpoint computing device 101 and personal computing devices 102-104, a GPS or other geographic location of endpoint computing device 101 and personal computing devices 102-104, an inferred location (e.g., based on a signal strength from a known WiFi router or cellular tower), or other location data. Further, in some embodiments proximity data 301 may indicate a proximity between endpoint computing device 101 and personal computing devices 102-104 based on whether a near-field session between or capability exists between endpoint computing device 101 and personal computing devices 102-104. This proximity data 301 may be, for example, data indicating whether a near-field (e.g., Bluetooth™, Bluetooth Low Energy™, NFC, infrared, etc.) session between endpoint computing device 101 and personal computing devices 102-104 is active, passive, in use-etc., or whether endpoint computing device 101 and personal computing devices 102-104 are in range of each other (e.g., can detect each other). Consistent with the discussion above, this proximity data 301 may be reported to security server 107. Alternatively, rather than report proximity data 301 itself to security server 107, events (e.g., loss of proximity, attainment of proximity, diminishing or fading proximity, etc.) may be reported to security server 107.

Proximity data 302 and 303 may each indicate a relative location or a signal strength of endpoint computing device 101 and personal computing devices 102-104 vis-à-vis a WiFi router 106, a cellular tower 105, or various other types of data communications systems. For example, proximity data 302 or 303 may indicate an inferred location based on which particular WiFi router 106, cellular station 105, or other communication system has the strongest signal strength with endpoint computing device 101 and personal computing devices 102-104. Alternatively, proximity data 302 and 303 may be raw signal strength data (e.g., measured in dB, dBm, RSSI, etc.). Proximity data 302 and 303, like proximity data 301, may also be reported to security server 107 or alerts regarding proximity data 302 and 303 may be sent to security server.

In system 300, losses in proximity between endpoint computing device 101 and personal computing devices 102-104 may be detected. When security server 107 detects such a loss in proximity, or receives a report regarding such a loss of proximity, security server 107 may implement a control action for the user's session on endpoint computing device 101. For example, as discussed above, the control or management session implemented on endpoint computing device 101 by security server 107 may determine, based on the loss of proximity, to terminate the user's session, suspend or freeze the session, require the user to re-authenticate themselves, limit the user's session to read-only access, generate alerts regarding the user's session, record (e.g., record session actions and traffic, record video, record audio, etc.) the user's session, or perform various other control actions. In accordance with this technique, the control actions may help to protect the endpoint computing device 101 and/or the content server 109 they are accessing, since a loss in proximity between endpoint computing device 101 and personal computing devices 102-104 may indicate a potential compromise or unauthorized use of endpoint computing device 101.

Figure 4:
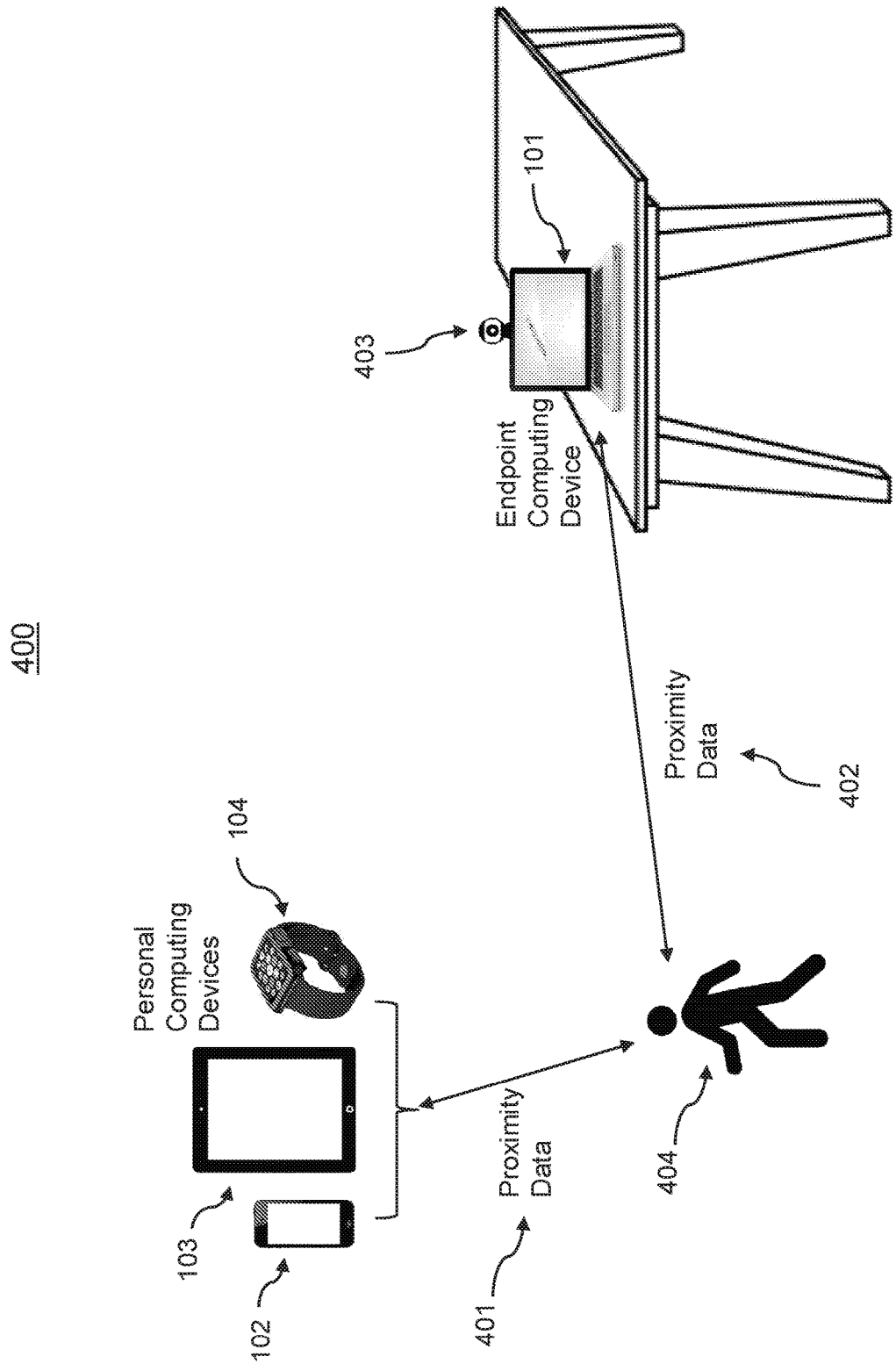
FIG. 4 is a block diagram of an exemplary system where a proximity between one or more personal computing devices and a user may be monitored in accordance with disclosed embodiments.

FIG. 4 illustrates a block diagram of an exemplary system 400 where a proximity 401-402 between one or more personal computing devices 102-104 and a user 404 may be monitored. Consistent with the above discussion, system 400 may correspond to system 100 of FIG. 1, and may utilize the browser or application interfaces of FIG. 2.

In accordance with system 400, and as discussed above, a user 404 may initially be authenticated at endpoint computing device 101 in a variety of ways. Some of these techniques may involve the user 404's proximity to endpoint computing device 101 (402) and/or to proximity personal computing devices 102-104 (401). As illustrated in FIG. 4, however, the user 404 may sometimes walk or move away from the proximity with endpoint computing device 101 and/or personal computing device 102-104. Because the user 404 losing proximity 401 with personal computing device 102-104 and/or with endpoint computing device 101 (402) may be an indication that the user 404's session on endpoint computing device 101 is vulnerable or compromised, the techniques described above may also detect this situation and potentially perform a control action.

For example, the user 404 losing proximity with endpoint computing device 101 and/or personal computing devices 102-104 may be detected through an internal or external imaging device 403 associated with endpoint computing device 101, such as a camera, motion sensor, facial recognition sensor, etc. Further, in some embodiments user 404 may physically possess one or more of personal computing devices 102-104 while they are moving away from one or more of the other personal computing devices 102-104. As an example, the user 404 may maintain possession of their smartphone 102, while leaving their tablet 103 at their workstation or table. In that situation, based on the proximity data 301 and 302 discussed above in connection with FIG. 3, the loss of proximity between smartphone 102 and tablet 103 may be detected. Alternatively, if smartphone 102 and tablet 103 have an established session (e.g., Bluetooth™, Bluetooth Low Energy™, NFC, etc.) between each other, the loss of that session may be detected as the user 404 walks away. In these events, a control action, as discussed further below, may be implemented. Further, in some embodiments personal computing devices 102-104 may each have an integrated software agent, which functions to share the location or session data of itself with others of personal computing devices 102-104 and/or with endpoint computing device 101. Based on this shared location or session data, a loss of proximity between the user 404 and certain personal computing devices 102-104 may be detected.

A further technique for determining a loss of proximity between a user 404 and endpoint computing device 101 and/or personal computing devices 102-104 may be by utilizing voice detection. For example, according to the techniques above, the management or control session implemented by security server 107 may perform voice or sound recognition using a microphone at endpoint computing device 101 and/or at personal computing devices 102-104. This may be performed via code, such as Java™ configured to record audio segments and analyze the segments. For example, the code may be configured to record audio content, and either analyze the content locally on endpoint computing device 101 and/or personal computing devices 102-104, or transmit the audio content to security server 107 for analysis (e.g., by creating or sharing a URL for an audio file). The analysis of the recorded audio may produce a voice or sound recognition profile for individual users or environments. According to this technique, when a new and unrecognized user or environment is detected, a control action may be implemented, as discussed below. Further, in some embodiments if a threshold period of time (e.g., minutes) elapses without a recognized user speaking, that may also result in a control action being implemented.

Figure 5:
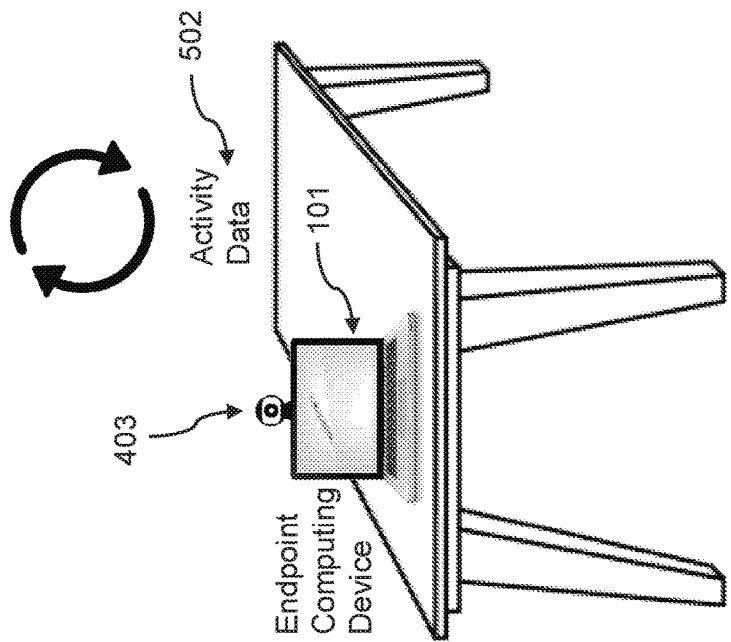
FIG. 5 is a block diagram of an exemplary system where anomalous activity or behavior at an endpoint computing device or one or more personal computing devices may be detected in accordance with disclosed embodiments.
Figure 5:
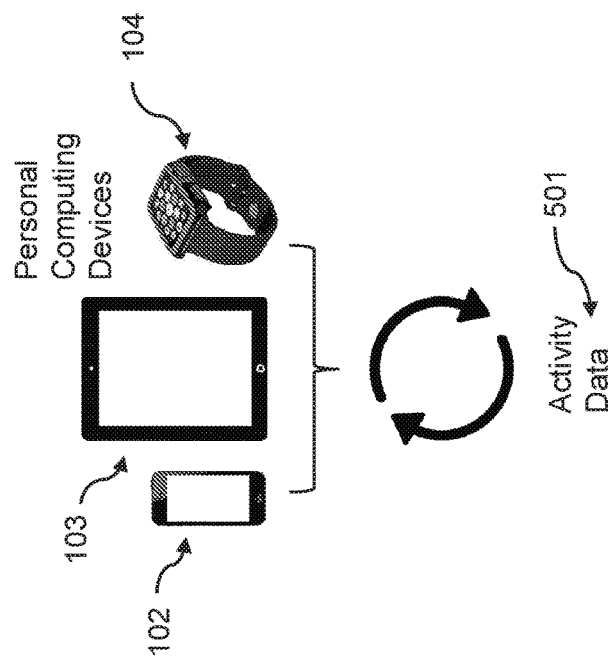

FIG. 5 illustrates a block diagram of an exemplary system 500 where anomalous activity or behavior at an endpoint computing device 101 or one or more personal computing devices 102-104 may be detected. As discussed above, system 500 may correspond to system 100 of FIG. 1, and may utilize the browser or application interfaces of FIG. 2. Further, in some embodiments system 500 may be the same as system 300. That is, in some embodiments techniques may be practiced for determining losses in proximity between endpoint computing device 101 and one or more personal computing devices 102-104 as well as anomalous activity by endpoint computing device 101 or one or more personal computing devices 102-104.

In accordance with system 500, activity data 501 may be observed or reported from personal computing devices 102-104, and activity data 502 may be observed or reported from endpoint computing device 101. As discussed above, various types of activity by users of these devices, as well as the devices themselves, may be tracked. For example, for personal computing devices 102-104 and endpoint computing device 101, data may be monitored such as applications accessed, network addresses used, resources or data downloaded, communications activity, typing patterns or content, cursor patterns, movement activity or patterns (e.g., detected via accelerometers, gyroscopes, etc.), and various other types of data. In some cases, personal computing devices 102-104 and endpoint computing device 101 may further perform biometric, physical, or biological identifications or scans of users (e.g., fingerprint recognition, handprint recognition, heartbeat recognition, retina scan reading, facial recognition, etc.). For example, endpoint computing device 101 may have an embedded or external camera 403, which may perform facial recognition and/or retinal scanning of users.

The activity data 501 and/or 502 may be transmitted to security server 107 either as raw data or as reports of activity. Security server 107, in turn, may maintain and develop behavioral profiles, personal characteristic profiles, or usage activity profiles for individual users. For example, such profiles may be based on observed patterns in users typing, scrolling, web browsing, social media interactions, file downloading or uploading, etc. Further, such profiles may store biometric or physical data associated with users. When security server 107 receives raw or reported activity data 501 and/or 503 from personal computing devices 102-104 and/or endpoint computing device 101, it may compare the received data against the stored profiles to identify anomalies or suspicious behavior. For example, depending on the specific type of data being compared, a degree of permitted error or deviation may be maintained at security server 107. As an illustration, certain behavioral types of data (e.g., typing patterns, browsing patterns, etc.) may have a margin of acceptable error of 10%, while other data (e.g., biological or biometric data) may have an acceptable margin of error of 0.01%. Of course, these margins of error may be adjusted based on the specific type of data being compared and based on a preferred false-positive or false-negative response rate.

Consistent with the discussion above, when a comparison of received activity data 501 and/or 502 produces an anomaly (e.g., the margin of error exceeds a threshold amount), a control action may be taken. This may include, as discussed above, code included in the application or browser being used in the user's session performing the control action. Notably, this control action may be implemented regardless of whether the endpoint computing device 101 has a current and active connection to security server 107. If the control or management session code is already inserted or integrated into the user's browser or other application on endpoint computing device 101, that code may execute automatically even without the presence of an active session with security server 107. In some embodiments, for added security, the inserted code may instruct the user's browser or application to automatically implement a particular control action (e.g., termination of a session) upon the loss of a connection with security server 107.

Figure 6:
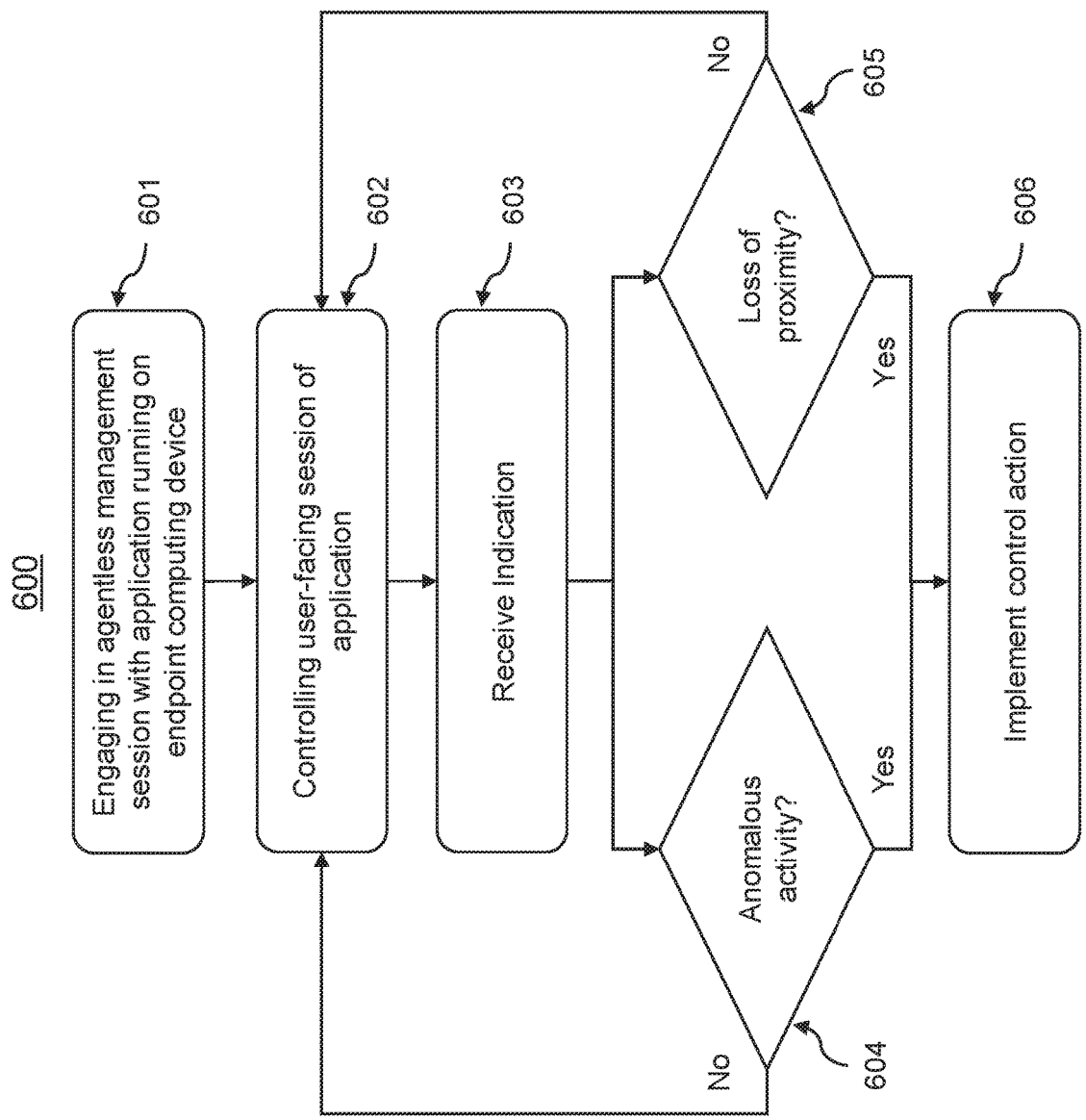
FIG. 6 is a flowchart depicting an exemplary process for automatically and transparently detecting potential compromises or unauthorized use of endpoint computing devices in accordance with disclosed embodiments.

FIG. 6 illustrates a flowchart of an exemplary process 600 for automatically and transparently detecting potential compromises or unauthorized use of endpoint computing devices. Consistent with the discussion above, process 600 may be implemented in the system environments of FIG. 1, 3, 4, or 5. For example, in some embodiments process 600 may be implemented by a security server 107. As noted above, security server 107 may be implemented as an integrated network resource in the network of endpoint computing resource 101, the network of content server 109, or a separate (e.g., independent) network.

In an operation 601, process 600 may include engaging, at a security server 107, in an agentless management session with an application running on an endpoint computing device 101. For example, as discussed above, a user of endpoint computing device 101 may access various types of applications running locally on endpoint computing device 101 and/or accessible remotely (e.g., from content server 109). Consistent with the discussion above, the management session may be implemented through code that is integrated or inserted into the browser or other application being utilized by the user on endpoint computing device 101. In this regard, the management session is agentless from the perspective of the endpoint computing device 101, because the management session does not require any dedicated application for purposes of the management session.

The management session may be implemented in a variety of techniques. For example, as discussed above, the management session may be a window or frame, such as an iframe, that is generated according a variety of different programming techniques (e.g., HTML-based, CSS-based, PHP-based, etc.). During the user's normal (e.g., non-anomalous in its activity, and/or having proximity between endpoint computing device 101 and one or more personal computing devices 102-104) session on endpoint computing device 101, the management session may run invisibly and transparently to the user and to endpoint computing device 101. When an anomaly in the activity on endpoint computing device 101 and/or a personal computing device 102-104 is detected, or when proximity is lost between endpoint computing device 101 and/or a personal computing device 102-104, the management session may execute a command to perform a control action on endpoint computing device 101.

Process 600 may also include an operation 602 of controlling, at the security server 107 and through the agentless management session, a user-facing session of the application. Because the management session may be transparent and invisible to the user of endpoint computing device 101, the controlling may be transparent and invisible as well, or may be visible to the user. For example, in embodiments where the management session is transparent to the user, the code inserted into the user's browser or other application may execute, or remain idle and awaiting execution, while the user's normal session on endpoint computing device 101 occurs. In such embodiments, the management session may only become visible to the user (e.g., based on a control action) if the user's session becomes anomalous or proximity is lost between endpoint computing device 101 and/or a personal computing device 102-104. That is, the management session may control the user's session in the sense that the management session is capable of controlling the user's session, even if no overt or affirmative act of control is performed until a control action is prompted.

Process 600 may further include an operation 603 of receiving, at the security server 107, an indication of at least one of anomalous activity (e.g., involving the user, the endpoint computing device 101, or one or more personal computing device 102-104 associated with the user) or a loss of a proximity between the one or more personal computing devices 102-104 associated with the user and the endpoint computing device 101. For example, consistent with the discussion above regarding FIG. 5, various types of anomalous activity or behavior may be detected on either or both of endpoint computing device 101 or personal computing devices 102-104. The anomalous activity or behavior may be detected by security server 107 based on reports of activity or behavior data sent to security server, based on alerts of such activity received from endpoint computing device 101 or personal computing devices 102-104, or through other techniques. If anomalous activity or behavior is detected by security server 107, process 600 may continue to operation 606 of performing a control action. If no anomalous activity is detected, process 600 may loop back to a prior step (e.g., operations 601 or 602). In that event, the user's user-facing session on endpoint computing device 101 may continue uninterrupted.

Alternatively, or in addition to detecting anomalous activity in operation 604, security server 107 may be configured to detect when a loss of proximity occurs between endpoint computing device 101 and one or more personal computing devices 102-104. The loss of proximity may be determined, as discussed above, based on geographic locations of endpoint computing device 101 and one or more personal computing devices 102-104 (e.g., determined through WiFi signal strength or locations, cellular signal strength or locations, etc.), the status of a near-field communications session or capability between endpoint computing device 101 and one or more personal computing devices 102-104 (e.g., Bluetooth™, Bluetooth™ Low Energy, NFC, infrared, etc.), or other techniques. Further, in some embodiments a loss of proximity may be detected when a user-recognition sensor or device (e.g., camera, fingerprint sensor, handprint sensor, etc.) determines that a user has left the endpoint computing device. Additionally, as discussed above, various techniques may detect a loss of proximity between a user and one or more personal computing devices 102-104. For example, through a video camera or facial recognition sensor, a user's presence or absence in proximity to endpoint computing device 101 and/or personal computing devices 102-104 may be detected. Similarly, location data or near-field wireless session data associated with personal computing devices 102-104 may detect when one of such devices (e.g., possessed by the user) moves away from another such device. In further embodiments, voice recognition may detect when a new and unrecognized user is speaking, or when a recognized user is silent for a threshold time.

In operation 605, if a loss in proximity is detected, process may continue to operation 606 of performing a control action for the user's user-facing session on endpoint computing device 101. Alternatively, if proximity is not detected to be lost, or is affirmatively determined to be present, process 600 may loop back to an earlier operation (e.g., operations 601 or 602) and the user's user-facing session may continue uninterrupted.

In operation 606, if either or both of operations 604 or 605 are satisfied in the affirmative, a control action may be performed for the user's user-facing session on endpoint computing device 101. As discussed above, the control action may occur in several different alternative forms, each of which may be individually configurable at security server 107. For example, a control action may include terminating the user's session (e.g., a local session or a session with content server 109), suspending or freezing the user's session, requiring the user to re-authenticate themselves (e.g., through a prompt as shown in FIG. 2) to security server 107, restricting the user's session to be read-only on endpoint computing device 101, recording the user's session through video, audio, or keystroke techniques, or various other control actions. Notably, in some embodiments a control action may be performed even if the management session between security server 107 and endpoint computing device 101 is lost. This may happen, for example, where a network cable connecting to endpoint computing device 101 is unplugged, where a wireless network card of endpoint computing device 101 is disabled, etc. In such situations, where security server 107 has already inserted management session code into the user's browser or other application (e.g., part of the HTML page, Java™ page, Flash™ page, etc.) that the user is interfacing with, the control action may be implemented even if a network connection is lost entirely. That inserted code may instruct the endpoint computing device to implement the control action. Of course, in other embodiments control actions may be performed affirmatively and directly from security server 107 to endpoint computing device 101 over the management session. A variety of different control options are possible as well, consistent with FIG. 6, based on the particular security and usability preferences of the developer of security server 107.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalitalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including alocal area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for detecting potential compromises or unauthorized use of endpoint computing devices, the operations comprising:
    engaging, at a security server, in an agentess management session with an application running on an endpoint computing device for use by a user;
    controlling, at the security server and through the agentess management session, a user-facing session of the application, the controlling comprising generating instructions for transmitting activity data and proximity data, the proximity data indicating a relative location of at least one of the endpoint computing device or one or more personal computing devices associated with the user;
    detecting, based on at last one of the activity data or the proximity data, an indication of at last one of:
    anomalous activity between at last one of: the user and the endpoint computing device, the user and the one or more personal computing devices, or the one or more personal computing devices and the endpoint computing device; or
    loss of a proximity based on the proximity data between at last one of: the one or more personal computing devices and the endpoint computing device, or the one or more personal computing devices and the user; and
    detecting, based on at least one of the anomalous activity or the loss of proximity, a potential unauthorized use of the endpoint computing device.

2. The non-transitory computer readable medium of claim 1, wherein the proximity data comprises data indicative of a location of at least one of: the endpoint computing device, the one or more personal computing devices, or the endpoint computing device relative to the one or more personal computing devices.

3. The non-transitory computer readable medium of claim 1, wherein the proximity data is based on a near-field communication between the endpoint computing device and at least one of the personal computing devices.

4. The non-transitory computer readable medium of claim 1, wherein the proximity data comprises an indication of a change in proximity between the endpoint computing device and at least one of the personal computing devices.

5. The non-transitory computer readable medium of claim 1, wherein the activity data comprises at least one of: a biometric, physical, or biological identification of the user.

6. The non-transitory computer readable medium of claim 1, wherein the activity data comprises at least one of: a typing activity, cursor activity, scrolling activity, browsing activity, or network activity.

7. The non-transitory computer readable medium of claim 1, wherein detecting the indication comprises:
    accessing at least one profile associated with the user; and
    comparing at least one of the activity data or the proximity data to the profile.

8. The non-transitory computer readable medium of claim 1, wherein the security server communicates with at least one of the endpoint computing device or the personal computing devices over the same network.

9. The non-transitory computer readable medium of claim 1, wherein the security server is on a different network from at least one of the endpoint computing device or the personal computing devices.

10. The non-transitory computer readable medium of claim 1, wherein the endpoint computing device communicates directly with the personal computing devices.

11. The non-transitory computer readable medium of claim 1, wherein the endpoint computing device communicates indirectly with the personal computing devices over a network.

12. A computer-implemented method for detecting potential compromises or unauthorized use of endpoint computing devices, the method comprising:
    engaging, at a security server, in an agentess management session with an application running on an endpoint computing device for use by a user;
    controlling, at the security server and through the agentess management session, a user-facing session of the application, the controlling comprising generating instructions for transmitting activity data and proximity data, the proximity data indicating a relative location of at least one of the endpoint computing device or one or more personal computing devices associated with the user;
    detecting, based on at last one of the activity data or the proximity data, an indication of at last one of:
    anomalous activity between at last one of: the user and the endpoint computing device, the user and the one or more personal computing devices, or the one or more personal computing devices and the endpoint computing device; or loss of a proximity based on the proximity data between at last one of: the one or more personal computing devices and the endpoint computing device, or the one or more personal computing devices and the user; and detecting, based on at least one of the anomalous activity or the loss of proximity, a potential unauthorized use of the endpoint computing device.

13. The computer-implemented method of claim 12, wherein the method further comprises:

receiving the activity data and the proximity data from at least one of: the endpoint computing device or the one or more personal computing devices.

14. The computer-implemented method of claim 12, wherein the agentless management session is implemented through code received by the application from the security server.

15. The computer-implemented method of claim 14, wherein the user-facing session is implemented through at least one of: a frame, a window, or an in-application interface of the application.

16. The computer-implemented method of claim 14, wherein the method further comprises:

implementing a control action through the agentless management session, the control action comprising at least one of:
generating a prompt for authentication of the user;
controlling access to the user-facing session;
recording at least one aspect of the user-facing session;
gathering information regarding at least one of: actions or traffic associated with the user-facing session; or
generating an alert regarding the user-facing session.

17. The computer-implemented method of claim 14, wherein the user-facing session is established based on a successful authentication of the user.

18. The computer-implemented method of claim 14, wherein the method is performed without requiring a dedicated agent on the endpoint computing device.

19. The computer-implemented method of claim 18, wherein the successful authentication is based, at least in part, on the proximity between the one or more personal computing devices and the endpoint computing device.

20. The computer-implemented method of claim 14, wherein the method is performed without receiving, at the security server, network traffic exchanged in the user-facing session.

\* \* \* \* \*